United States Patent
Truong et al.

(10) Patent No.: US 11,715,285 B2
(45) Date of Patent: *Aug. 1, 2023

(54) METHODS AND SYSTEMS FOR PROVIDING IMAGES FOR FACILITATING COMMUNICATION

(71) Applicant: Capital One Services, LLC, McLean, VA (US)

(72) Inventors: Anh Truong, Champaign, IL (US); Vincent Pham, Champaign, IL (US); Fardin Abdi Taghi Abad, Champaign, IL (US); Jeremy Goodsitt, Champaign, IL (US); Mark Watson, Philadelphia, PA (US); Austin Walters, Savoy, IL (US); Kate Key, Effingham, IL (US); Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 224 days.

This patent is subject to a terminal disclaimer.

(21) Appl. No.: 17/110,882

(22) Filed: Dec. 3, 2020

(65) Prior Publication Data

US 2021/0090588 A1 Mar. 25, 2021

Related U.S. Application Data

(63) Continuation of application No. 16/425,347, filed on May 29, 2019, now Pat. No. 10,896,686.

(51) Int. Cl.
| | |
|---|---|
| G06V 10/764 | (2022.01) |
| G10L 21/10 | (2013.01) |
| G10L 15/22 | (2006.01) |
| G06F 3/14 | (2006.01) |
| G06F 16/53 | (2019.01) |

(Continued)

(52) U.S. Cl.
CPC .............. *G06V 10/764* (2022.01); *G06F 3/14* (2013.01); *G06F 16/53* (2019.01); *G06V 10/82* (2022.01); *G10L 15/22* (2013.01); *G10L 15/26* (2013.01); *G10L 21/06* (2013.01); *G10L 21/10* (2013.01);

(Continued)

(58) Field of Classification Search
CPC ....... G10L 21/00; G10L 21/06; G10L 21/065; G10L 21/10
See application file for complete search history.

(56) References Cited

U.S. PATENT DOCUMENTS

| | | | |
|---|---|---|---|
| 5,933,805 A | 8/1999 | Boss et al. | |
| 6,377,925 B1 * | 4/2002 | Greene, Jr. ............. | G10L 21/06 704/235 |

(Continued)

FOREIGN PATENT DOCUMENTS

| | | |
|---|---|---|
| EP | 1129440 A1 | 9/2001 |
| WO | 200028495 A1 | 5/2000 |

OTHER PUBLICATIONS

U.S. Appl. No. 16/425,248, filed May 29, 2019, Issued.

(Continued)

*Primary Examiner* — Samuel G Neway
(74) *Attorney, Agent, or Firm* — DLA Piper LLP US

(57) ABSTRACT

Aspects of the disclosure include computer-implemented methods and systems for providing generative adversarial network (GAN) digital image data. GAN digital image data corresponding to a suggested transaction for an identified customer can be determined.

18 Claims, 6 Drawing Sheets

(51) Int. Cl.
*G10L 15/26* (2006.01)
*G10L 21/06* (2013.01)
*G06V 10/82* (2022.01)
*G09B 21/00* (2006.01)
*G06V 40/20* (2022.01)

(52) U.S. Cl.
CPC ............ *G06V 40/20* (2022.01); *G09B 21/009* (2013.01); *G10L 2015/223* (2013.01)

(56) References Cited

U.S. PATENT DOCUMENTS

| | | | |
|---|---|---|---|
| 6,507,643 B1* | 1/2003 | Groner | H04L 51/066 |
| | | | 704/E15.044 |
| 7,133,513 B1* | 11/2006 | Zhang | H04M 3/42221 |
| | | | 379/202.01 |
| 7,457,757 B1 | 11/2008 | McNeill et al. | |
| 8,457,688 B2* | 6/2013 | Stenmark | H04M 1/6016 |
| | | | 455/3.06 |
| 10,303,428 B2 | 5/2019 | Yang et al. | |
| 10,303,963 B1 | 5/2019 | Edwards et al. | |
| 10,333,934 B1 | 7/2019 | Fox et al. | |
| 10,339,508 B1 | 7/2019 | Wurmfelf | |
| 10,446,158 B1 | 10/2019 | Edwards et al. | |
| 10,509,949 B1 | 12/2019 | Mossoba et al. | |
| 10,581,625 B1 | 3/2020 | Pandey et al. | |
| 10,803,859 B1 | 10/2020 | Williams et al. | |
| 10,878,800 B2 | 12/2020 | Truong et al. | |
| 10,896,686 B2* | 1/2021 | Truong | G06F 16/53 |
| 2002/0198716 A1* | 12/2002 | Zimmerman | G10L 21/06 |
| | | | 704/E15.045 |
| 2004/0249634 A1 | 12/2004 | Degani et al. | |
| 2005/0267761 A1* | 12/2005 | Ueno | H04M 1/72436 |
| | | | 704/277 |
| 2005/0286705 A1 | 12/2005 | Contolini et al. | |
| 2009/0043583 A1 | 2/2009 | Agapi et al. | |
| 2009/0171670 A1 | 7/2009 | Bailey et al. | |
| 2010/0216511 A1 | 8/2010 | Stenmart et al. | |
| 2011/0092187 A1* | 4/2011 | Miller | H04W 4/12 |
| | | | 455/566 |
| 2011/0208523 A1* | 8/2011 | Kuo | G10L 15/26 |
| | | | 704/235 |
| 2012/0250039 A1 | 10/2012 | Ollivierre et al. | |
| 2012/0251985 A1* | 10/2012 | Steels | G09B 19/06 |
| | | | 434/156 |
| 2013/0079061 A1* | 3/2013 | Jadhav | H04M 1/7243 |
| | | | 455/563 |
| 2014/0046661 A1* | 2/2014 | Bruner | H04N 21/6582 |
| | | | 704/235 |
| 2016/0062987 A1* | 3/2016 | Yapamanu | H04M 3/42 |
| | | | 704/2 |
| 2016/0104486 A1 | 4/2016 | Penilla et al. | |
| 2016/0210982 A1 | 7/2016 | Sherman et al. | |
| 2017/0195791 A1 | 7/2017 | Pedersen | |
| 2017/0206913 A1 | 7/2017 | Nahman et al. | |
| 2017/0309269 A1 | 10/2017 | Baba et al. | |
| 2018/0083587 A1 | 3/2018 | Tammi et al. | |
| 2018/0249002 A1 | 8/2018 | Allison | |
| 2018/0277132 A1 | 9/2018 | LeVoit | |
| 2018/0302687 A1* | 10/2018 | Bhattacharjee | H04N 21/4884 |
| 2018/0341643 A1 | 11/2018 | Alders et al. | |
| 2019/0164544 A1 | 5/2019 | Friedman et al. | |
| 2020/0381004 A1* | 12/2020 | Truong | G06V 10/764 |
| 2021/0090588 A1* | 3/2021 | Truong | G06V 10/82 |

OTHER PUBLICATIONS

Xiong et al., "Learning to generate time-lapse videos using multi-stage dynamic generative adversarial networks." Proceedings of the IEEE Conference on Computer Vision and Pattern Recognition. (Year: 2018).
Schindler, et al., "Recognizing Emotions Expressed by Body Pose: a Biologically Inspired Neural Model", Neural 2008, 20 pages.
Lopes, et at., "Facial expression recognition with Convolutional Neural Networks: Coping with few data and the training order", Pattern Recognition, Jul. 21, 2016, 54 pages.
Pigou, et al., "Sign Language Recognition using Convolutional Neural Networks", European Conference on Computer 2014, 8 pages.
Farivar, et al., "Dynamic Vocabulary Customization in Automated Voice Systems", U.S. Appl. No. 16/168,480, filed Oct. 23, 2018, 48 pages.
Wikipedia, "Biometrics", https://en.wikipedia.org/wiki/Biometrics, Apr. 17, 2019, 16 pages.
Jain ,et al., "An Introduction to Biometrics", Proceedings of 19th International Conference on Pattern Recognition, 2008, 1 page.
Wikipedia, "Speaker recognition", https://en.wikipedia.org/wiki/Speaker_recognition, Apr. 17, 2019, 5 pages.
Beigi, "Fundamentals of Speaker Recognition", 2011, Springer US, 983 pages.
Wikipedia, "Convolutional neural network", https://en.wikipedia.org/wiki/Convolutional_neural_network, Apr. 17, 2019.
Wikipedia, "Recurrent neural network", https://en.wikipedia.org/wiki/Recurrent_neural_network, Apr. 17, 2019, 16.
Yann, et al., "Convolutional networks for images, speech, and time series", The handbook of brain theory and neural 1995, 14 pages.
Reed, et al., "Generative Adversarial Text to Image Synthesis", Proceedings of the 33rd International Conference on Learning, vol. 48, 2016, 10 pages.
Goodfellow, et al., "Generative Adversarial Nets", Proceedings of Advances in Neural Information Processing Systems, 9 pages.
Wikipedia, "Generative adversarial network", https://en.wikipedia.org/wiki/Generative_adversarial_network, Apr. 23, 2019, 7 pages.

\* cited by examiner

METHODS AND SYSTEMS FOR PROVIDING IMAGES FOR FACILITATING COMMUNICATION

CROSS-REFERENCE TO RELATED APPLICATIONS

This application is a continuation of U.S. application Ser. No. 16/425,347, filed May 29, 2019, the content of which is incorporated herein by reference in its entirety.

This application is related to U.S. patent application Ser. No. 16/425,248, which is titled "Methods And Systems For Providing Changes To A Voice Interacting With A User", filed May 29, 2019, the content of which is incorporated herein by reference in its entirety.

FIELD

The present disclosure relates generally to providing images for facilitating communication.

BACKGROUND

When people are visiting an establishment (e.g., a store or restaurant), they often wish to communicate (e.g., in order to make a transaction). For example, when a person cannot understand either spoken or written communications related to a transaction, help may be needed in order for the person to complete the transaction. There is a need to provide help to make the process easier.

SUMMARY

Aspects of the disclosure include a computer-implemented method for interacting with a user. Identity information for a user can be received. The identity information can be analyzed to identify the user. User information for an identified user can be retrieved, the user information indicating that a voice interacting with the identified user is to be translated into image data to help the identified user communicate with the voice. Translated image data translating voice instructions by the voice can be retrieved. The translated image data can be displayed to the identified user.

Aspects of the disclosure can also include accepting instructions from the identified user based on user interaction with the translated image data. The translated image data can include photographic image data and/or non-photographic image data. The photographic image data can be generated using a generative adversarial network (GAN). A sequence of voice instructions can be translated into a sequence of photographic images using the GAN. The translated image data can include pre-defined images representing possible transactions.

Aspects of the disclosure can include retrieving historical transaction information for the user, and determining a suggested transaction for the user based on the historical transaction information. Aspects of the disclosure can also include: determining the suggested transaction using previous transactions made by other users with demographics similar to the user; determining the suggested transaction using previous transactions made by the user; or determining the suggested transaction using a current location of the user and previous transactions made at the current location; or any combination thereof Aspects of the disclosure can include a system for interacting with a user, the system including: a memory storing instructions and a processor. The processor can be configured to: receive physiological information and/or behavioral information for the user representing identifying information for a user; analyze the physiological information and/or the behavioral information for the user to determine an identity of the user; determine a need to provide photographic image data translating voice communication from a voice interacting with the user; display translated photographic image data translating the voice interacting with the user using a generative adversarial network (GAN); and accept instructions from the user.

According to some aspects, the translated photographic image data can be displayed in a video format. The processor can also be configured to: play audio data while the translated photographic image data is displayed; and/or display text data while the translated photographic image data is displayed.

According to some aspects, the processor can also be configured to: receive feedback information comprising body language information for the user; determine if the body language information signifies: an inability to understand the voice, a misunderstanding of the voice, or displeasure with a user experience, or any combination thereof; analyze the body language information in order to identify help information; and store the help information for the user.

According to some aspects, the processor can be configured to: receive feedback information comprising language spoken by the user; determine if the language spoken by the user includes pre-defined words signifying: an inability to understand the voice, a misunderstanding of the voice; or displeasure with a user experience, or any combination thereof; analyze the language spoken by the user in order to identify help information; and store the help information for the user.

According to some aspects, the processor can be configured to: receive feedback information from the user, the feedback information indicating difficulty the user has with understanding the transaction option; analyze the feedback information in order to identify help information; and store the help information for the user. The feedback information can include survey information.

According to some aspects, the processor can be configured to: receive feedback information from the user related to the appearance of a GAN translated photographic image; and store the feedback information for future application. The feedback information can include preferences related to: color, template, outline, font, or font size, or any combination thereof.

According to some aspects, a device can be provided for communicating with a user. The device can include a memory storing instructions and a processor. The processor can be configured to: display translated photographic image data translating a voice interacting with the user using a generative adversarial network (GAN); and accept instructions from the user. The processor can also be configured to determine a need to provide the translated photographic image data. The processor can also be configured to: determine multiple transaction options for an identified user based on historical data; and display an image for each transaction option. The processor can also be configured to: determine a probability for each transaction option; and display transaction option images in order of probability.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION OF EMBODIMENTS OF THE INVENTION

Embodiments of the present disclosure may help facilitate communication with a user (e.g., in order to help complete a transaction). For example, when people are going to an establishment (e.g., a bank, restaurant/bar, movie theater, theme park, sports venue, music venue, etc.) or visiting an establishment's physical mobile site, web site or mobile device application, it may make it easier for them to communicate and/or complete a transaction if they can better communicate and/or if a relevant transaction were suggested. Examples using a banking institution establishment are discussed below. However, those of ordinary skill in the art will see that the system may also be used by many other types of establishments.

Figure 1:
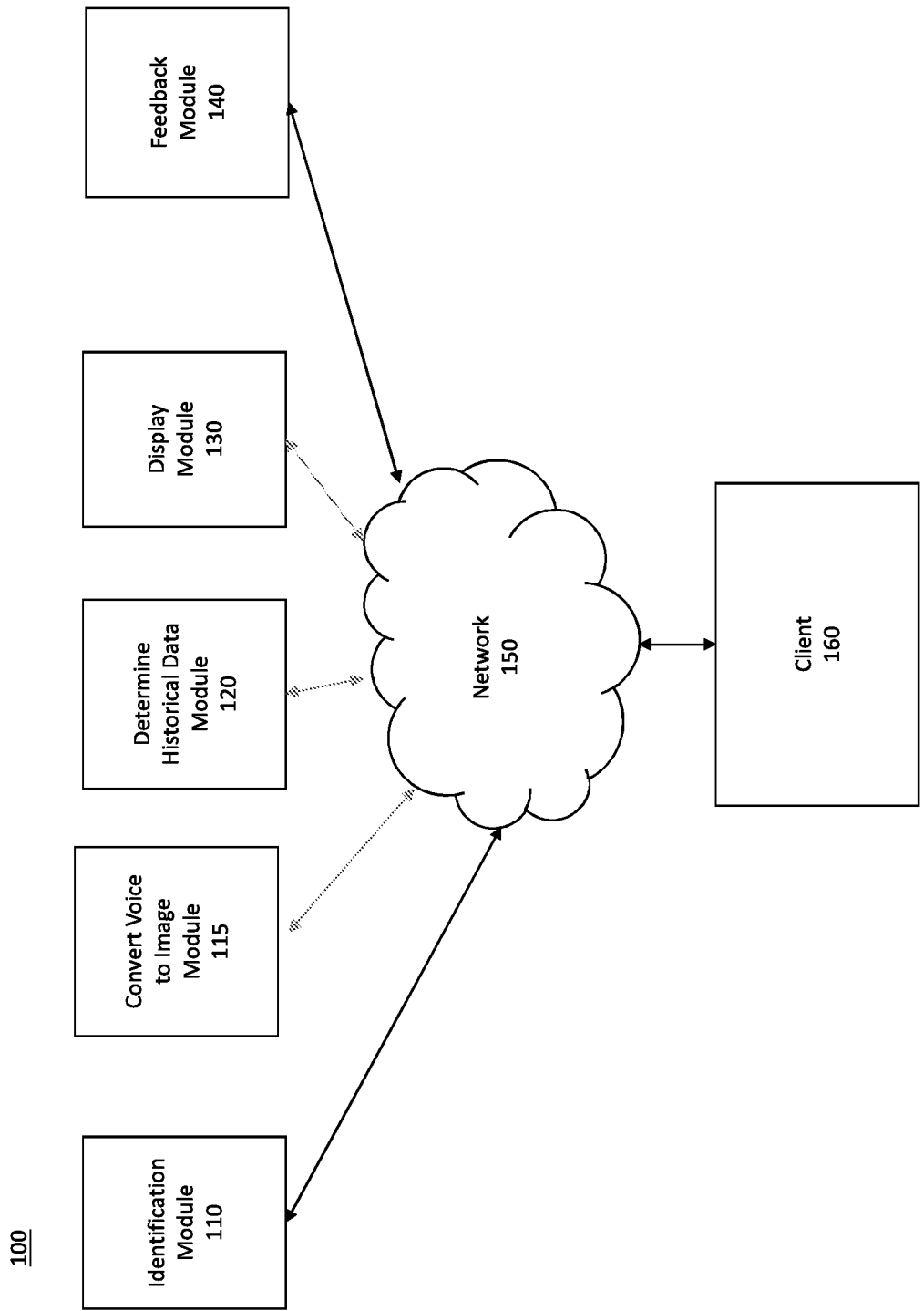
FIG. 1 is a diagram of an illustrative system 100 for interacting with a user, according to some embodiments of the present disclosure.

FIG. 1 is a diagram of an illustrative system 100 for communicating with a user in order to complete a transaction, according to some embodiments of the present disclosure. As shown in FIG. 1, a client 160 can access (e.g., over a network 150) an identification module 110, a convert voice to image module 115, a determine historical data module 120, a display module 130, and a feedback module 140.

The identification module 110 can identify the user using analyzed identity information. In some aspects of the disclosure, a credit card, photo ID, or other type of identification can be analyzed to identify the user. In other aspects, physiological information and/or behavioral information can be received from the user and provided to an identification system, and used to identify the user. The physiological information can include: iris data; retina data; eye vein data; fingerprint data; hand geometry data; facial data; or finger vein data; or any combination thereof. The behavioral information can include signature information and/or voice information.

For example, the user can interact with a system that scans her eye, checks her fingerprint, hand, face or finger, or any combination thereof. In addition, the user can be asked to provide a signature or talk so that her signature or voice can be identified by the system.

The determine historical data module 120 can: review historical information for the identified user, provide needed help information, or suggest one or more transactions based on this analyzed historical transaction data, or any combination thereof. The historical information can include feedback information and/or needed help information (e.g., such as whether or not the user would benefit from use of the convert voice to image module 115).

For example, the historical information can determine if previous feedback information has been provided for an identified user. For example, it can be determined that the identified user has had trouble understanding the voice of a customer service representative and/or a recorded voice interacting with the user. In this case, the convert voice to image module 115 can be used to help the user understand what the customer service representative and/or the recorded voice are saying. Multiple examples of other types of feedback information are described below in more detail.

The historical information can include previous transactions made by the user and/or other users with demographics similar to the user. The historical transaction information may also include information about where the user makes different types of transactions (e.g., at an establishment's physical site, a physical mobile site, a web site, a mobile device application, etc.).

If the system is a banking system, possible transactions made by the user can include: opening an account, deposit funds (e.g., cash, check, electronic funds), transfer funds (e.g., within or out of the banking system), withdraw funds (e.g., cash, change in specific denominations ($1 bills, $5 bills, quarters, etc.), view information on an account (e.g., checking, savings, line of credit, mortgage, car loan, other loan), pay a bill (e.g., make a one time payment or set up an auto payment), obtain a cashier's check and/or money order, apply for a mortgage or other loan, get an item notarized, request information for an account issue, etc.

For example, historical transaction information for a particular user can indicate that this user usually only uses the banking institution's physical banking machine to withdraw the maximum amount of cash allowed. Thus, once the banking system identifies the user as using one of their physical banking machines, the banking system can suggest that the user wishes to withdraw the maximum amount of cash allowed.

As another example, historical transaction information for a particular user can indicate that this user transfers $500 (using the banking institution's mobile application) into her 20 year old daughter's account on the first of every month. Thus, if the user logs onto the mobile application at the first of the month, it can suggest that the user transfer $500 to her daughter's account.

As a further example, historical transaction information for a particular user can indicate that this user visit's the establishment's web site at the end of the month to pay a car loan. Thus, if the user logs in to the establishment's web site at the end of the month, it can suggest that the user pay the car loan payment.

For example, historical transaction information for users in a person's demographic (e.g., men over 60) can indicate that it is common for users within this demographic withdraw cash every other Friday (e.g., payday). As another example, historical information for users in another person's demographic (e.g., men between 18 and 30) can indicate that it is common for these users to electronically transfer funds (e.g., move money from checking to savings account) and pay bills (e.g., credit card bill, telephone bill) every other Friday (e.g., payday).

The convert voice to image module 115 can translate the voice communicating with the user into one or more images. The translated images can be photo images and/or non-photo images. For example, for elderly people with hearing issues, they may also not be able to read (e.g., in a particular language or in any language). In this case, displaying text may not help and images may be more useful for the user.

In some embodiments, the convert voice to image module 115 can generate photos using a generative adversarial network (GAN). The GAN can be a deep learning model that can translate one or more voice instructions to one or more photo instructions that are easy for the user to understand. In some embodiments, the voice instructions can be translated into text. Then, the GAN can synthesize images from the text. More information on the GAN can be found in the following, which are all herein incorporated by reference:

Reed, Scott et al., "Generative Adversarial Text to Image Synthesys," *Proceedings of the 33rd International Conference on Machine Learning* (New York, N.Y., USA, 2016).

Goodfellow, Ian et al., "Generative Adversarial Nets," *Proceedings of Advances in Neural Information Processing Systems* (NIPS2014) pp. 2672-2680.

Apr. 23, 2019 Generative Adversarial Network Wikipedia page (https://en.wikipedia.org/wiki/Generative_adversarial_network).

For example, the system can translate the voice saying "click on the green button to approve" into text. The GAN can then translate the text into a photo showing a hand pointing to a green button that has "OK" on it. As another example, the system can translate "show me your debit card or ID" into a photo showing a debit card and driver's license.

In some embodiments, the convert voice to image module 115 can generate photo images and/or non-photo images by recognizing key words in the voice that cause certain pre-determined photo images and/or non-photo images to be displayed. For example, if the convert voice to image module 115 recognizes the key words "show ID", a screen can be displayed showing a photo image or a non-photo image of a debit card, a credit card, and a driver's license.

The display module 130 can display one or more images representing one or more suggested transactions. In some embodiments, the images can be actual photographs or appear to be photographs (e.g., an image that appears to be a photo of a hand pointing to a green button, the photo generated using a computer). In some embodiments, the images can be non-photographic images (e.g., a computer icon or computer image of a hand pointing to a green button).

Instructions from the user can be accepted based on user interaction with the image. The images can include pictures visualizing the different types of transactions. The display module 130 can also display one or more images (e.g., photo images and/or non-photo images) showing actions the user can take with respect to a suggested transaction (e.g., hand pointing to green button). The display module 130 can also display one or more images showing actions taken by the establishment (e.g., a picture of a receipt when a receipt is being printed). The images can include still images and/or video.

If the system is a banking system, some example transaction images can include: deposit funds (e.g., a picture of putting cash into a piggy bank), transfer funds (e.g., an image of moving cash from one picture of a bank to another picture of a bank)), withdraw funds (e.g., an image of taking cash out of a piggy bank), view information on an account (e.g., an image of a piece of paper with account information on it)), pay a bill (e.g., an image of sending an envelope with money in it), obtain a cashier's check and/or money order (e.g., an image of a cashier's check or money order), apply for a mortgage or other loan (e.g., an image of a house, car, etc.), get an item notarized (e.g., an image of a notary stamp), request information for an account issue (e.g., a question mark over small image of sample account summary), ask a question (e.g., a question mark), etc.

In some aspects of the disclosure, the images can be video images. For example, one or more suggested transaction images can be shown as videos that play once, or over and over until the user chooses a transaction. As another example, the videos can be shown when a user chooses a particular suggested transaction image.

The system can also play audio data while the image data is displayed. For example, data explaining a particular suggested transaction can be played while the image for that suggested transaction is shown.

If multiple transactions are suggested, the transaction can be displayed in order of probability (e.g., with the most probably transaction listed first), and any audio data can be played in the same order the transactions are listed on the screen.

In addition, the system can display text data while the image data is displayed. The text data can be displayed near or on the image.

The feedback module can receive feedback information from or for the user. The feedback information can include: body language information for the user, language spoken by the user, or survey information, or any combination thereof. The feedback module can determine if the body language information and/or the language spoken by the user signifies: an inability to understand the voice, a misunderstanding of the voice, or displeasure with a user experience, or any combination thereof. The feedback module can analyze the body language information in order to identify help information.

The feedback module can determine any difficulty the user has with understanding a transaction option. The feedback module can also analyze the feedback information in order to identify help information.

The feedback module can also help determine any preferences the user has for GAN translated photographic image data. For example, the feedback module can receive feedback information related to the appearance of GAN translated photographic image data. The feedback information can include: body language information for the user, language spoken by the user, or survey information, or any combination thereof. This feedback information can be stored and applied to generate GAN translated photographic image data according to the user's preferences when the user returns. The feedback information can include preferences related to: color, template, outline, font, or font size, or any combination thereof. Using user feedback on a photo showed to a user, the preferences of that user can be determined. For example, it can be determined that general users (or users in a certain demographic, or a particular user) tend to like photos better that have: dark colors rather than light colors, no green and/or blue colors, content focused at the center (as opposed to spread-out content).

In some embodiments, training data can be restricted to generate synthetic images based on the user preferences. For example, using the example feedback provided above, the system can only select synthetic images with dark colors, simple content focused at the center of the screen, a big font size, etc. This information can train the GAN model. Thus, when the user returns to the bank, the system can apply the GAN model.

Figure 2:
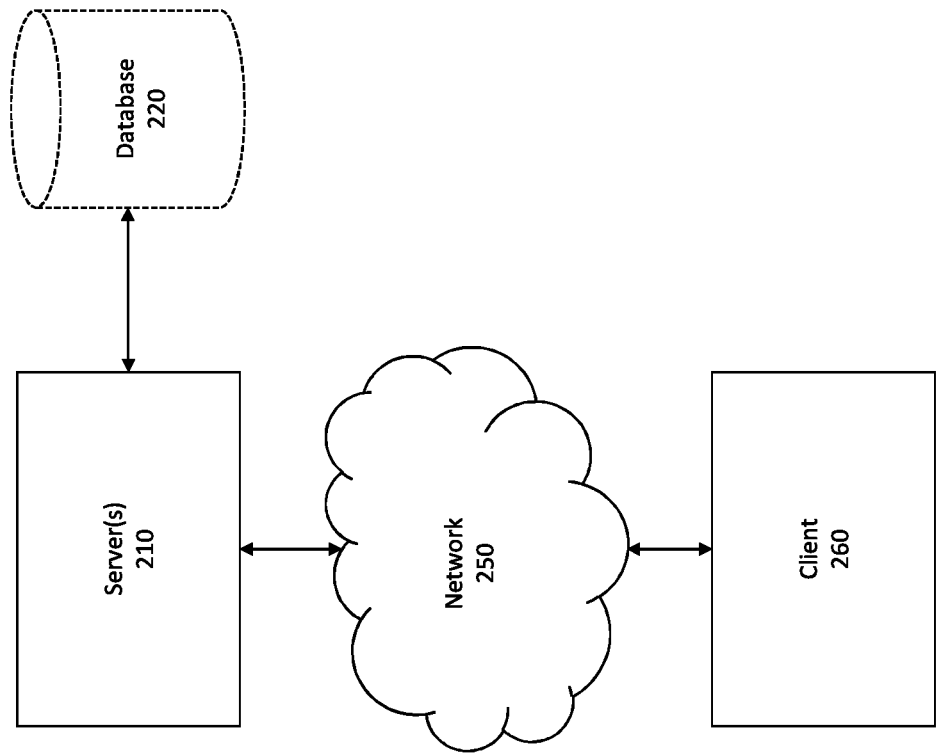
FIG. 2 is another diagram of an illustrative system 200 for interacting with a user, according to some embodiments of the present disclosure.

FIG. 2 is another diagram of an illustrative system 200 for providing a suggested transaction, according to some embodiments of the present disclosure. As shown in FIG. 2, a client 260 can access (e.g., over a network 150 using server(s) 110) data representing transactions between customers and establishments stored in a database 120. The database 120 can store instructions in one or more memories.

Figure 3:
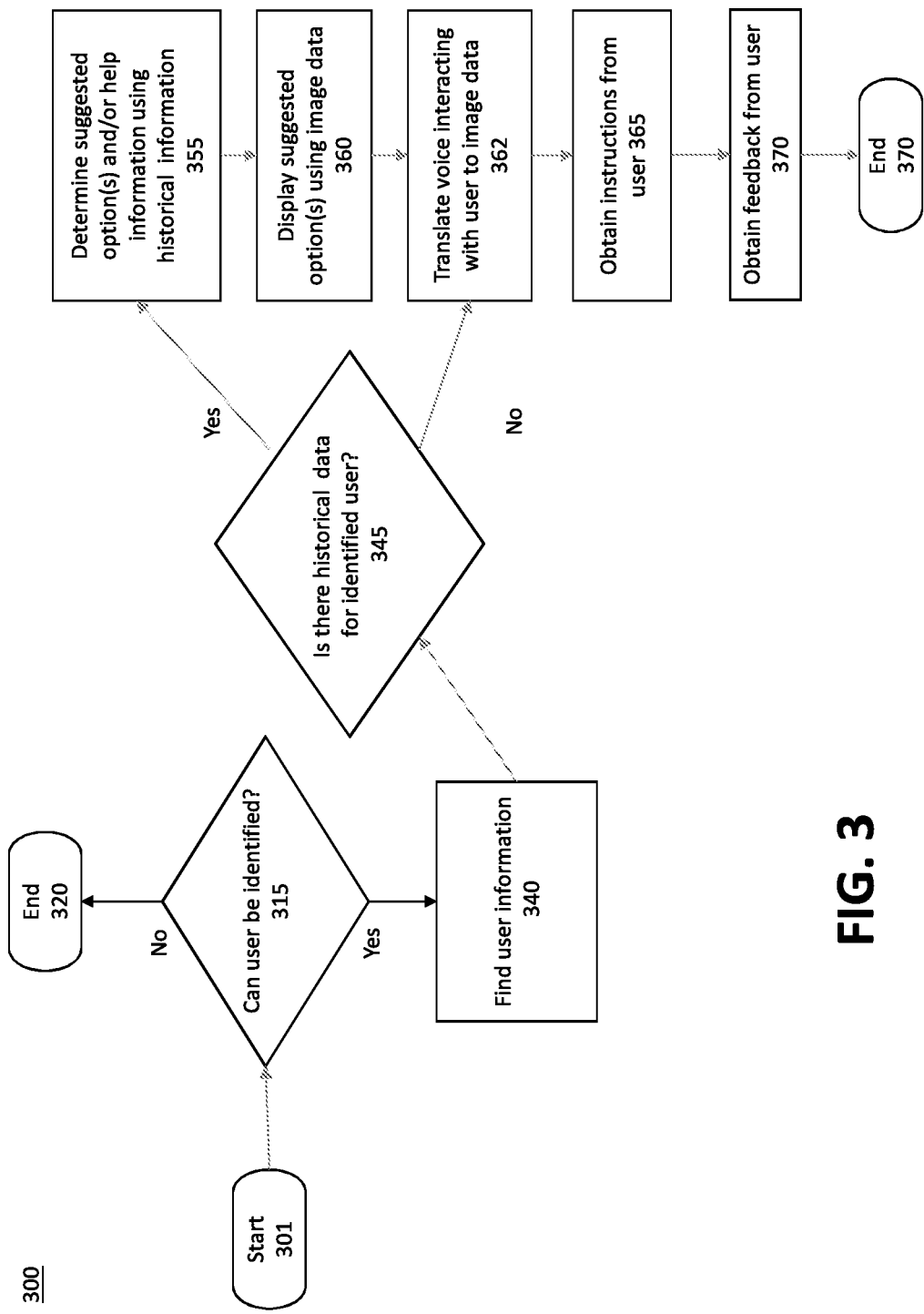
FIG. 3 is a flow diagram 300 showing processing that may occur when providing an insight within the system of FIGS. 1 and/or 2, according to some embodiments of the present disclosure.

FIG. 3 is a flow diagram 300 showing processing that may occur within the system of FIG. 1 and/or FIG. 2, according to some embodiments of the present disclosure. In step 301, the process can start. In step 315, it can be determined if a user can be identified. If not, in step 320, the process can end. If yes, in step 340, user information can be found. In step 345, it can be determined if historical data for the identified user can be found. If not, the process can move to 362. If yes, the process can move to step 355, where suggested transaction options and/or help information can be determined. In 360, suggested transaction options can be displayed using image (e.g., photo image and/or non-photo image) data. In 362, a voice (e.g., live or recorded) interacting with the user can be translated to image (e.g., photo image and/or non-photo image) data. In 365, instructions from the user can be obtained. In 370, feedback from the user can be obtained. In 375, the process can end.

Figure 4:
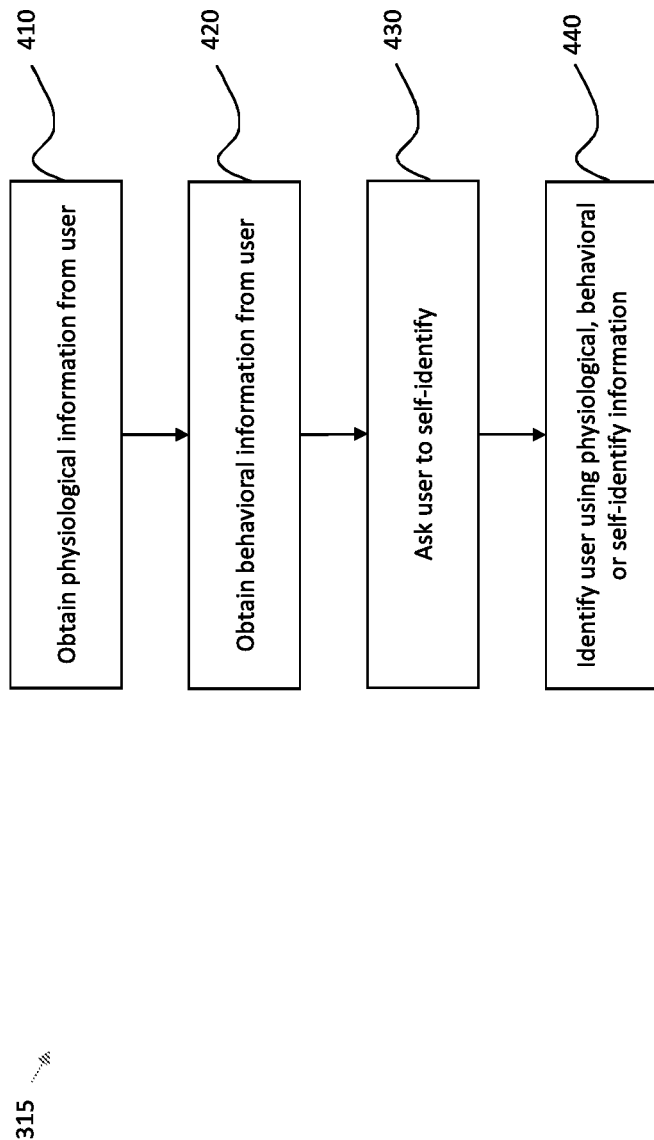
FIG. 4 is a flow diagram 400 showing processing that may occur when identifying a user within the system of FIGS. 1 and/or 2, according to some embodiments of the present disclosure.

FIG. 4 is a flow diagram showing additional processing that may occur in step 315 of flow diagram 300 of FIG. 3, according to some embodiments of the present disclosure. In 410, physiological information can be obtained from the user. In 420, behavioral information can be obtained from the user. In 430, the user can be asked to self-identify. In 440, the user can be identified using the physiological, behavioral or self-identified information.

Figure 5:
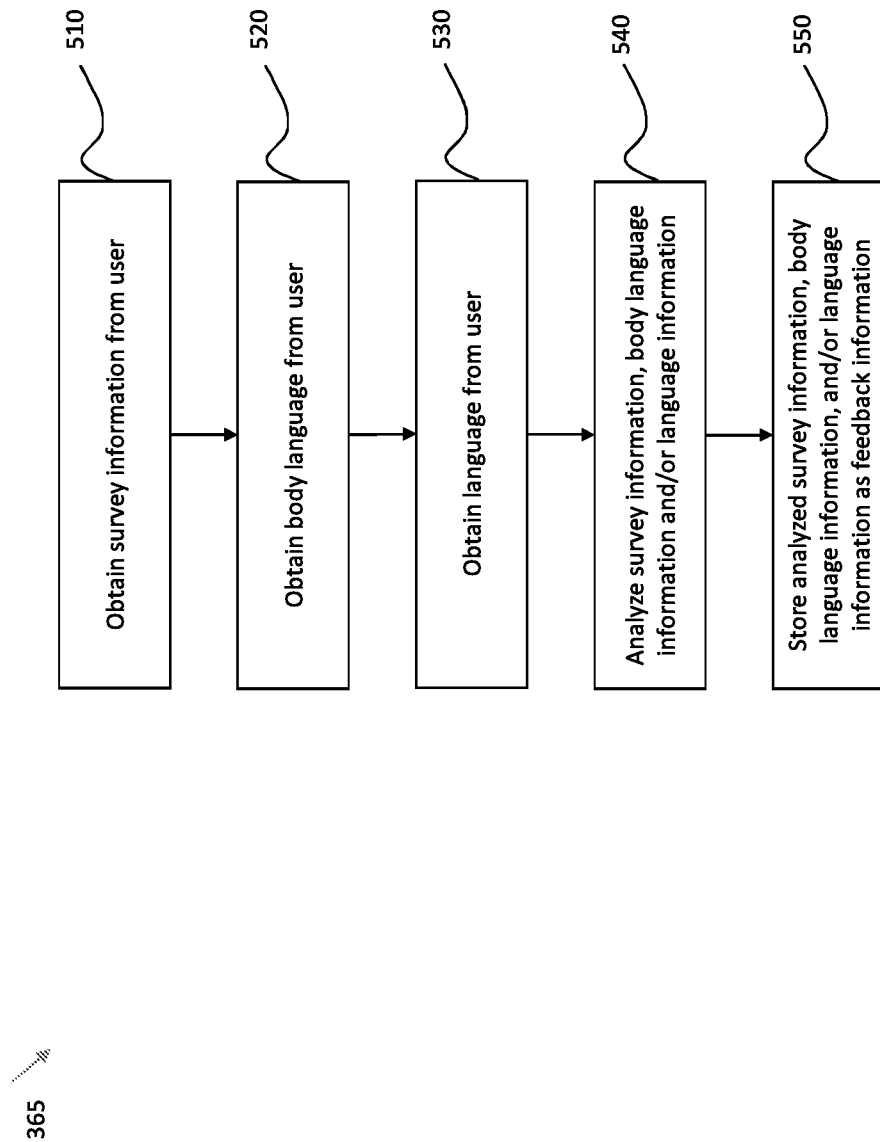
FIG. 5 illustrates a flow diagram 500 showing processing that may occur when analyzing and storing feedback information within the system of FIGS. 1 and/or 2, according to some embodiments of the present disclosure.

FIG. 5 is a flow diagram showing additional processing that may occur in step 365 of flow diagram 300 of FIG. 3, according to some embodiments of the present disclosure. In step 510, survey information can be obtained from the user. In step 520, body language can be obtained from the user. In step 530, language can be obtained from the user. In 540, the survey information, the body language information, and/or the language information can be analyzed. In 550, the analyzed survey information, the body language information, and/or the language information can be analyzed as feedback information.

In some aspects of the disclosure the transaction data can include many different properties related to a transaction. This may include: a customer name, a customer ID (e.g., anonymous or not) that allows identification of a person who is making a purchase and what other purchases they have made before and after that transaction, merchant, merchant ID (e.g., anonymous or not), merchant name, location of merchant, amount of the purchase, or how a purchase was made (e.g., in person, online, with APPLE PAY, with card dip, with card swipe, etc.), or any combination thereof. The confluence of seeing a multitude of transaction data may provide for powerful insights.

Methods described herein may represent processing that occurs within a system for providing an insight about an establishment (e.g., system 100 of FIG. 1 and/or system 200 of FIG. 2). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors (e.g., processor 600 in FIG. 6) executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Figure 6:
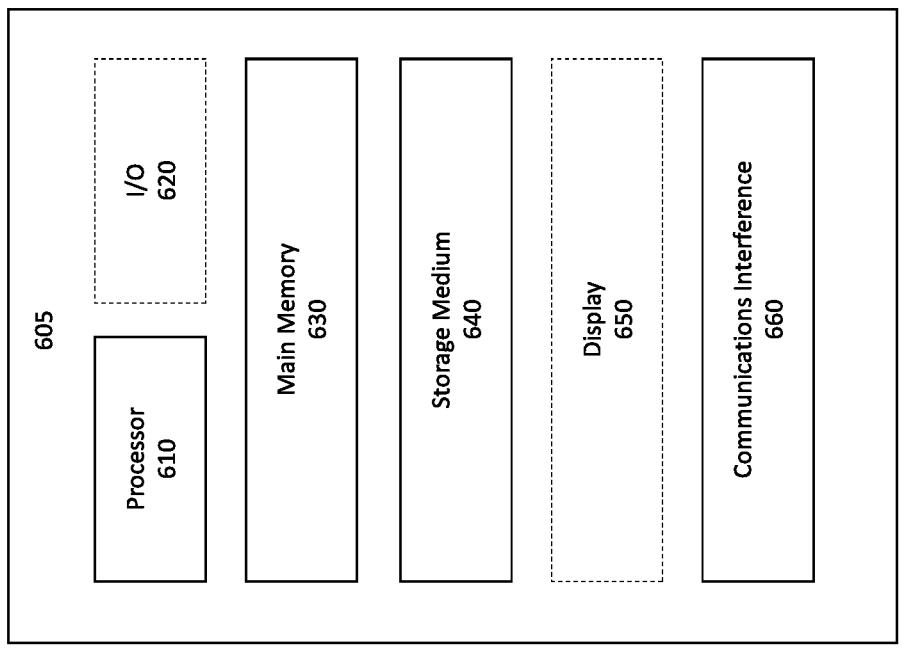
FIG. 6 illustrates an example computer 600, according to some embodiments of the present disclosure.

FIG. 6 illustrates an example computer 605, according to some embodiments of the present disclosure. Computer 605 can include a processor 610 suitable for the execution of a computer program, and can include, by way of example, both general and special purpose microprocessors, and any one or more processor of any kind of digital computer. A processor can receive instructions and data from a main memory 630 (e.g., a read only memory or a random access memory or both). Processor 610 can execute instructions and the memory 630 can store instructions and data. A computer can include, or be operatively coupled to receive data from or transfer data to, or both, a storage medium 640 for storing data (e.g., magnetic, magneto optical disks, or optical disks). Information carriers suitable for embodying computer program instructions and data can include all forms of nonvolatile memory, including by way of example semiconductor memory devices, such as EPROM, EEPROM, flash memory device, or magnetic disks. The processor 610 and the memory 630 can be supplemented by, or incorporated in, special purpose logic circuitry. The computer 605 can also include an input/output 620, a display 650, and a communications interface 660.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Accordingly, other implementations are within the scope of the following claims. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

In addition, it should be understood that any figures which highlight the functionality and advantages are presented for example purposes only. The disclosed methodology and system are each sufficiently flexible and configurable such that they may be utilized in ways other than that shown. For example, other steps may be provided, or steps may be eliminated, from the described flows, and other components may be added to, or removed from, the described systems. In addition, the order of the steps illustrated or described may be changed.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for providing generative adversarial network (GAN) digital image data to a customer, comprising:
   determining generative adversarial network (GAN) user preferences related to GAN digital image data preferred by an identified customer;
   retrieving, by a computer system, historical transaction information for an identified customer, the historical transaction information comprising previous banking-related transactions completed by the customer and which banking option the customer used to make each previous banking-related transaction;
   receiving a live voice communication of a service representative interacting with the identified customer;
   translating the live voice communication into text;
   recognizing pre-designated words in the text;
   determining, by the computer system, GAN digital image data corresponding to a suggested transaction for the identified customer, the suggested transaction determined using the pre-designated words in the text and the historical transaction information, the GAN digital image data determined using the GAN user preferences; and
   displaying, by the computer system, the GAN digital image data to the identified customer.

2. The method of claim 1, comprising:
   receiving instructions, from the computer system, indicating that the live voice of the service representative interacting with the identified customer is to be translated into the GAN digital image data to help the identified customer communicate with the live voice.

3. The method of claim 1, wherein a sequence of voice instructions is translated into a sequence of GAN photographic digital images.

4. The method of claim 1, wherein translated GAN digital image data comprises pre-defined GAN digital images representing possible transactions.

5. The method of claim 1, further comprising:
   accepting, by the computer system, instructions from the identified customer based on user interaction with translated GAN digital image data.

6. The method of claim 1, comprising:
   determining a suggested transaction based on the historical transaction information using: previous transactions made by other users with demographics similar to the identified customer; the previous transactions made by the identified customer; and a current location of the identified customer and the previous transactions made at the current location.

7. A system for interacting with a customer, comprising:
   a memory storing instructions; and
   a processor that, when executing the instructions, is configured to:
   determine generative adversarial network (GAN) user preferences related to GAN digital image data preferred by an identified customer;
   retrieve historical transaction information for the identified customer, the historical transaction information comprising previous banking-related transactions completed by the customer and which banking option the customer used to make each previous banking-related transaction;
   receive a live voice communication of a service representative interacting with the identified customer;
   translate the live voice communication into text;
   recognize pre-designated words in the text;
   determine generative adversarial network (GAN) photographic digital image data corresponding to a suggested transaction for the identified customer, the suggested transaction determined using the pre-designated words in the text and the historical transaction information, the GAN digital image data determined using the GAN user preferences; and
   display translated GAN photographic digital image data translating the live voice interacting with the identified customer.

8. The system of claim 7, wherein translated GAN photographic digital image data is displayed in video form.

9. The system of claim 7, wherein the processor is configured to:
   play audio data while translated GAN photographic digital image data is displayed.

10. The system of claim 7, wherein the processor is configured to:
    display text data while translated the GAN photographic digital image data is displayed.

11. The system of claim 7, wherein the processor is configured to:
    receive feedback information comprising body language information for the identified customer;
    determine if the body language information signifies: an inability to understand the live voice, a misunderstanding of the live voice, or displeasure with a user experience, or any combination thereof;
    analyze the body language information in order to identify help information; and
    store the help information for the identified customer.

12. The system of claim 7, wherein the processor is configured to:
- receive feedback information comprising language spoken by the customer;
- determine if the language spoken by a user comprises pre-defined words signifying: an inability to understand the live voice, a misunderstanding of the live voice; or displeasure with a user experience, or any combination thereof;
- analyze the language spoken by the identified customer in order to identify help information; and
- store the help information for the identified customer.

13. The system of claim 7, wherein the processor is configured to:
- receive feedback information from the identified customer, the feedback information indicating difficulty the identified customer has with understanding a transaction option;
- analyze the feedback information in order to identify help information; and
- store the help information for the identified customer.

14. The system of claim 13, wherein the feedback information comprises survey information.

15. A device for communicating with a customer, comprising:
- a memory storing instructions; and
- a processor that, when executing the instructions, is configured to:
  - determine generative adversarial network (GAN) user preferences related to GAN digital image data preferred by an identified customer;
  - receive a live voice communication of a service representative interacting with the identified customer;
  - translate the live voice communication into text;
  - recognize pre-designated words in the text;
  - retrieve historical transaction information for an identified customer, the historical transaction information comprising previous banking-related transactions completed by the customer and which banking option the customer used to make each previous banking-related transaction;
  - determine GAN photographic digital image data corresponding to a suggested transaction for the identified customer, the suggested transaction determined using the pre-designated words in the text and the historical transaction information, the GAN digital image data determined using the GAN user preferences; and
  - display translated GAN photographic digital image data translating the live voice interacting with the identified customer.

16. The device of claim 15, wherein the processor is configured to:
- determine a need to provide translated GAN photographic digital image data.

17. The device of claim 15, wherein banking options comprise: at an establishment's physical site, a physical mobile site, a web site, a mobile device application.

18. The device of claim 17, wherein the processor is configured to:
- determine a probability for each suggested transaction option; and
- display transaction option GAN photographic digital images using probability information.

* * * * *